June 25, 1935.  A. D. STEWART  2,006,035

WATER HEATER CONTROL

Filed July 20, 1932  2 Sheets-Sheet 1

Inventor.
Alden D. Stewart
By Cameron, Kirkam & Sutton
Attorneys

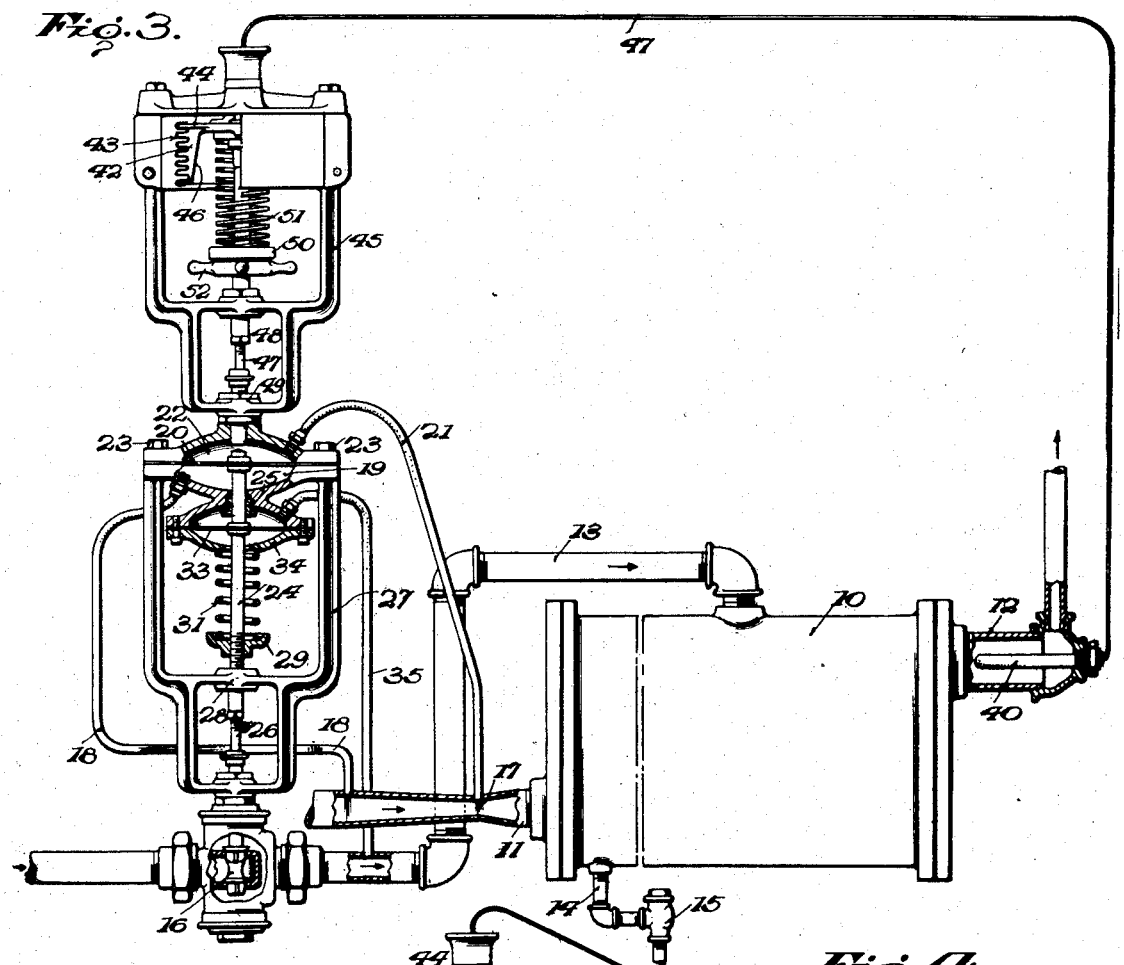
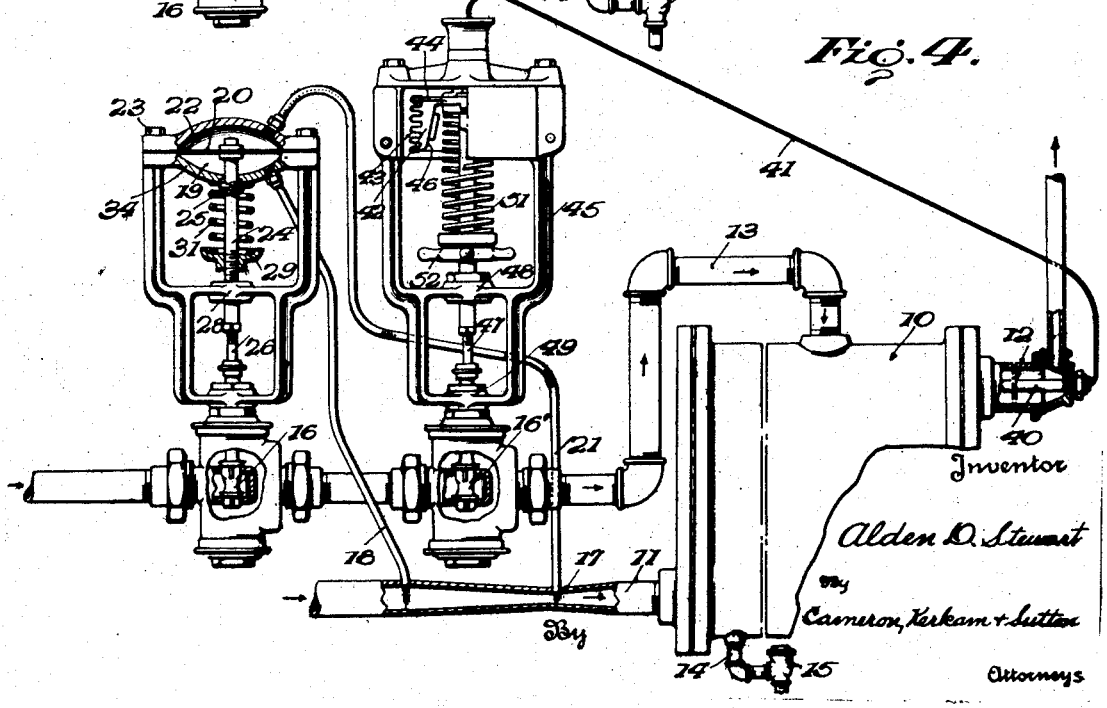

Patented June 25, 1935

2,006,035

UNITED STATES PATENT OFFICE 2,006,035

WATER HEATER CONTROL

Alden D. Stewart, Knoxville, Tenn., assignor to The Fulton Sylphon Company, Knoxville, Tenn., a corporation of Delaware Application July 20, 1932, Serial No. 623,676

25 Claims. (Cl. 236—20)

This invention relates to mechanism for automatically controlling the flow of heating medium to what may be generically characterized as instantaneous water heaters, and particularly to mechanism of this character wherein the heating medium employed is steam, and it is an object of this invention to provide mechanism of the type referred to whereby a more prompt and accurate control of the temperature of the water flowing from the heater may be obtained, to the end that said water may be maintained at a substantially uniform temperature.

It has heretofore been the practice to regulate the supply of heating medium to a heater of the type referred to by a thermostatic control subjected to the temperature of the water flowing from the heater. When the heater is under a full and substantially continuous load, a control of this character is able to maintain a fairly close regulation of the temperature, but when the heater is running at less than full load, and particularly when there is any substantial variation in the rate of hot water consumption, there is a very substantial time lag in the response of the thermostat control, as well as considerable "hunting" or "cycling". For example, if the tank is running at full load and the thermostatic valve is functioning to admit the proper amount of steam to bring the water at that rate of consumption to its desired temperature, and then the water consumption is reduced one-half, the thermostat will not be affected by the overheated water arising from the excess steam consumption for a considerable period of time dependent upon the period required for the overheated water to reach the thermostat at the outlet of the heater. There is not only this time lag in the response of the thermostat, but during the period of delay the temperature of the water rises to such an extent that the steam valve is over adjusted by the thermostat when the overheated water reaches the latter, and then dependent upon the time required for the consequently underheated water to reach the thermostat, there is another time lag before the steam valve is again readjusted, and this readjustment is likely to be excessive, so that there results an undesirable "hunting" or "cycling" of the steam valve.

Various mechanisms have been suggested to render the thermostatic mechanism sensitive in response to fluctuations of temperature in the hot water consumption, but on the one hand these devices are more or less complicated and expensive and on the other hand they are still open to the objection that by submitting the control element to the water at the outlet of the heater, time lag and hunting and cycling are still present to a substantial extent. It has also been proposed to control the valve for admitting a gas to a heater by the differential pressure existing in a venturi in a water pipe, so that the supply of gas is adjusted in conformity with the pressures in the water pipe existing by reason of the existing rate of flow. Devices of this character are responsive to the fluctuating rate of water consumption, but as heretofore proposed they are open to the objection of requiring frequent and nice adjustment, because of the fact that any given setting of the valve by reason of a differential pressure in the venturi is proper only so long as there is no fluctuation in the pressure of the gas or in the temperature of the water.

It is an object of this invention to provide an automatic valve mechanism for instantaneous water heaters which is sensitively and accurately responsive to changes in the rate of consumption of hot water in order to maintain a substantially uniform temperature and which is also available for use in conjunction with steam as a heating medium.

Another object of this invention is to provide an automatic controlling mechanism for instantaneous water heaters using steam as the heating medium which eliminates the need for a separate reducing valve in the steam line.

Another object of this invention is to provide an automatic control for instantaneous water heaters which is responsive to the rate of consumption of the water and requires a minimum of adjustment to function properly under varying conditions of inlet water temperature or pressure in the heating medium.

Another object of this invention is to provide an automatic control for instantaneous water heaters wherein the supply of heating medium is controlled both from the rate of consumption of the water and the pressure of the heating medium.

Another object of this invention is to provide an automatic control for instantaneous water heaters wherein the supply of heating medium is controlled both from the rate of consumption of the water and the temperature of the water.

Another object of this invention is to provide an automatic control for instantaneous water heaters wherein the flow of heating medium is controlled from the rate of water consumption, the water temperature and the pressure of the heating medium.

Another object of the present invention is to provide an improved automatic control for instantaneous water heaters which minimizes the time lag and the hunting or cycling of the valve mechanism in its operation to maintain a substantially uniform water temperature.

Another object of this invention is to provide an improved automatic control for instantaneous water heaters which will function as satisfactorily under partial load as under full load.

Another object of this invention is to provide an automatic control for instantaneous water heaters which is relatively simple in construction and economical in operation.

Other objects will appear as the description of the invention proceeds.

The invention is capable of receiving a variety of mechanical expressions, some of which are shown in the accompanying drawings, but it is to be expressly understood that the drawings are for purposes of illustration only and are not to be construed as a definition of the limits of the invention, reference being had to the appended claims for that purpose.

In said drawings, wherein the same reference characters are used to indicate corresponding parts in the several figures.

Figure 1:
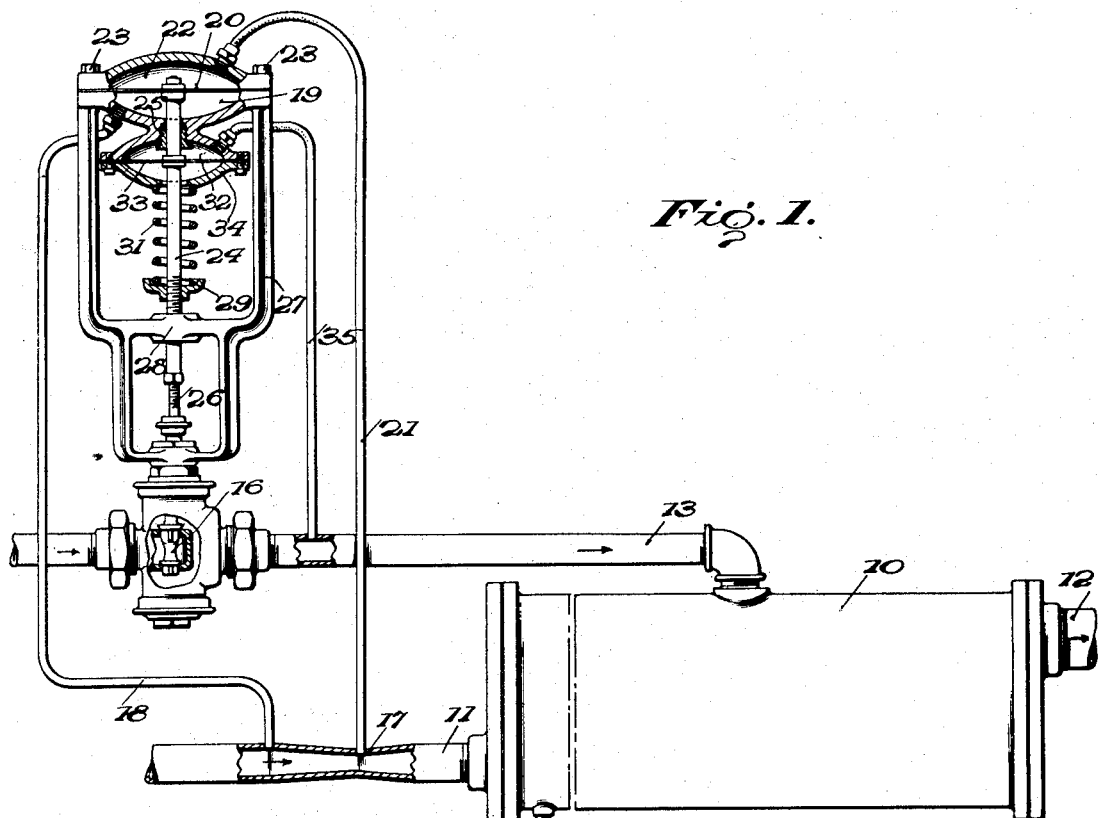
Fig. 1 is a somewhat diagrammatic elevation partly in section illustrating an embodiment of the present invention wherein the valve is automatically controlled both from the rate of water consumption and from the pressure of the heating medium.

Fig. 3 is a somewhat diagrammatic elevation partly in section of an embodiment of the present invention wherein the heating medium is controlled from the rate of water consumption, the temperature of the water and the pressure of the heating medium, and Fig. 4 is a somewhat diagrammatic elevation illustrating the use of two automatic valve mechanisms respectively responsive to two of the foregoing sources of control.

Referring more particularly to the drawings, 10 designates an instantaneous water heater of any suitable form, construction and size provided with a water inlet 11 and a water outlet 12. In the preferred embodiment of the invention, steam is used as the heating medium, and will be hereinafter referred to as such, and the heater 10 is therefore provided with a steam inlet pipe 13 and an outlet 14 for the condensate, which may be provided with a suitable trap 15. Mounted within the steam inlet pipe 13 is a valve generally indicated at 16, of any suitable construction, designed to be automatically controlled to maintain a substantially uniform temperature in the water flowing through the outlet 12.

In accordance with the present invention valve 16 is subjected to a primary control which is responsive to fluctuations in the rate of water consumption and which depends for its operation upon the relative pressures existing in the water at two points in the conduit by reason of a constriction existing therebetween. As will be readily appreciated by those skilled in the art, this constriction may be provided in a variety of ways, as by the provision of an orifice of predetermined size, for example by the use of a venturi, etc., but for purposes of illustration the venturi has been selected to explain the present invention, but it is to be expressly understood that a metering orifice may be used instead, if preferred, and it is the intention of the present specification and claims to include the metering orifice as well as the venturi as illustrated.

Referring to Fig. 1, the water inlet pipe 11 is shown as provided with a venturi at 17, although it is to be expressly understood that the illustrated location of the venturi is not essential. Communicating with the mouth of the venturi is a pipe 18 which extends to a pressure chamber 19 closed by any suitable pressure responsive device, here shown as a diaphragm 20 of any suitable material and construction. Communicating with the throat of the venturi is a second pipe 21 communicating with a second pressure chamber 22 on the opposite side of said diaphragm 20. Said pressure chambers may be formed in any suitable way, as by a pair of bowl-shape chambers which are suitably secured together and clamp the diaphragm 20 between the same, as by means of bolts 23. Suitably connected to diaphragm 20 is a stem 24 which passes through a gland 25 in the wall of the pressure chamber 19 and which extends to and is connected in any suitable way with a valve stem 26 projecting from the valve 16. As shown, the pressure chambers 19 and 20 are carried by a framework 27 which is suitably secured to the bonnet of the valve 16 and which also affords a guide at 28 for the valve stem. Adjustably mounted on the stem 24 is a spring abutment plate 29, between which and a fixed abutment on the frame is disposed a coil spring 31, which, by its action on the abutment 29 and stem 24, tends to normally urge the valve 16 toward closed position.

When no water is flowing through the pipe 11 the pressure in the mouth and throat of the venturi 17 is equal, and therefore there are equal pressures in the chambers 19 and 22, and the spring 31 therefore holds the valve 16 in its closed position. When water is being withdrawn from the heater 10 and there is a flow through the pipe 11, there is a drop in pressure between the mouth and the throat of the venturi, the magnitude of the pressure drop being dependent upon the rate of water flow through the pipe 11. Hence a differential in pressure is created between the chambers 19 and 22, with the excess pressure in the chamber 19. This excess pressure in the chamber 19, acting on the diaphragm 20, opens the valve 16 against the tension of the spring 31 to an extent which is directly proportional to the flow of water through the pipe 11. Hence the extent to which the valve 16 is open is directly dependent upon the rate of water consumption, and any variation in the rate of water flow in the pipe 11 produces an immediate response in the chambers 19 and 22 to readjust the position of the valve 16 in conformity with the new rate of water flow. Therefore, by suitably designing the spring 31, the diaphragm 20 and the valve 16, the amount of steam admitted to the heater by the valve 16 may be made exactly proportional to the rate of flow of the water through the pipe 11 as reflected in the drop of pressure existing between the mouth and the throat of the venturi, while the adjustment provided for the abutment 29 enables the spring 31 to be adjusted so as to vary the steam flow and the number of degrees through which the water is heated within predetermined limits.

In order to fit the device as heretofore described for use of steam as the heating medium, provision should also be made to assure that the steam is admitted to the heater at a substantially uniform and predetermined pressure for any given position of the valve 16, as otherwise the extent to which the water will be heated will vary with varying steam pressures even though the valve 16 be accurately positioned in conformity with the rate of water flow for a given steam pressure. In practice variations of steam pressure are common, and particularly in industrial plants there may be a considerable variation in steam pressure at different times of the day. The embodiment of Fig. 1 also provides for an automatic maintenance of predetermined steam pressures for predetermined valve positions, and furthermore obviates the need for a separate reducing valve. As shown, a second pressure chamber 32 is provided on the frame 27, and as here shown is formed integrally with the wall of the pressure chamber 19. Said pressure chamber 32 is closed by any suitable pressure responsive device, here shown as a diaphragm 33 of any suitable material and construction, and is shown as clamped to the bowl-shaped wall of the chamber 32, as by a bowl-shaped cover member 34 which also constitutes the fixed abutment for the spring 31. Communicating with said pressure chamber 32 is a pipe 35 which leads to the steam pipe 13 on the low pressure side of the valve 16.

The pressure in the pipe 13 is transmitted to the chamber 32 by the pipe 35 and acts on the diaphragm 33 to tend to close the valve 16, therefore acting in conjunction with the spring 31 and the pressure in the chamber 22. By suitably proportioning diaphragm 33 to diaphragm 20, the pressure in the chamber 32, added to the pressure in the chamber 22 and the tension of the spring 31, will provide such a differential pressure as respects the pressure in the chamber 19 as will position the valve 16 suitably for maintaining a predetermined pressure in the steam flow. As long as the steam pressure does not vary the valve mechanism will be solely under the control of fluctuations in pressure in the chambers 19 and 22 as determined by the rate of water flow, but in the event that there is a change in the steam pressure, the pressure on the outlet side of the valve 16 will increase or decrease, increasing or decreasing the pressure in the chamber 32, and thereby decreasing or increasing the opening of the valve 16 to compensate for the fluctuating steam pressure. Hence the admission of steam is not only instantaneously responsive to any fluctuation in the rate of water consumption, but also to any fluctuation in the pressure of the steam.

While as shown a spring 31 is used as an auxiliary force in tending to move the valve toward closed position, it will be apparent that the spring is not essential, it being understood that the diaphragm areas are so selected that the algebraic sum of any spring tension when used and the pressures in the chambers 19, 22 and 32, or in the chambers 19 and 22 if the steam pressure control is omitted, will effect the operation as above described. If no spring is used the steam flow will be directly proportional to the differential pressures existing on the diaphragm or diaphragms, as the case may be, but this differential may be relatively increased or decreased by the use of a spring tending to move the valve stem in the appropriate direction.

In place of a supplementary controlling mechanism subjected directly to variations of steam pressure, it is sometimes desirable to have such supplementary controlling mechanism responsive to variations of temperature of the water in the outlet from the heater. Such a control will adjust the valve mechanism if the heating effect of the steam, due to changes of pressure, tends to vary the temperature of the water, although this will not be effected quite as promptly as with the automatic control shown in Fig. 1. On the other hand, such a control possesses the advantage that it is responsive to changes of water temperature due to variations in the temperature of the inlet water. Thus, the apparatus of Fig. 1 will raise the temperature of the water through a predetermined number of degrees and accurately vary the steam flow in conformity with the rate of water consumption, but a drop in the temperature of the inlet water tends to cause a corresponding drop in the temperature of the outlet water because the apparatus of Fig. 1 will continue to accurately maintain the same predetermined heating effect of the steam varying with the water consumption. A thermostatic control in the outlet from the heater, however, will respond to a change in the outlet temperature and readjust the steam flow to compensate for a change in the temperature of the inlet water as well as a fluctuation in the heating effect of the steam.

Figure 2:
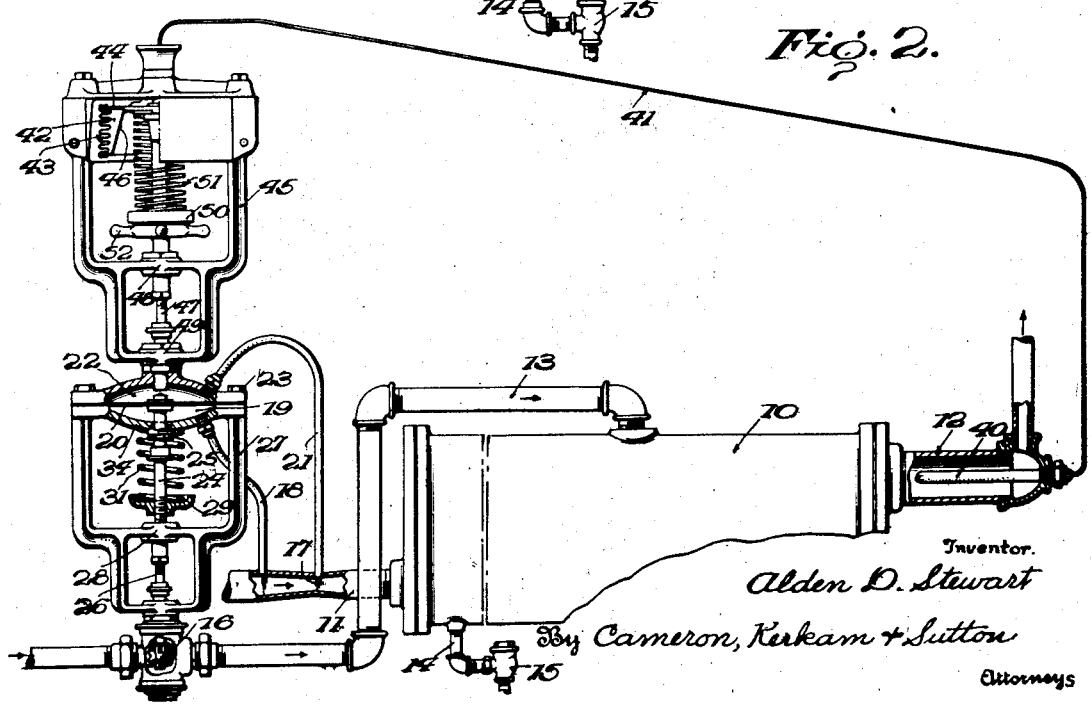
Fig. 2 is a somewhat diagrammatic elevation partly in section of an embodiment of the present invention wherein the heating medium is controlled both from the rate of water consumption and the temperature of the water.

Fig. 2 shows an embodiment of the present invention wherein the control of the steam valve in conformity with variations in the rate of water flow is supplemented by a control which is dependent upon the temperature of the water flowing out of the heater. The automatic mechanism for adjusting the valve 16 in conformity with the variations of flow through the venturi 17 may be and is illustrated as of the same construction as shown in Fig. 1, and the parts are therefore designated by corresponding reference characters. In this embodiment the outlet 12 of the heater has suitably mounted in the wall thereof the bulb 40 of a thermostatic device which communicates through a suitable pipe 41, which may be flexible or rigid, with an expansible and collapsible vessel 42, here shown as provided by a bellows 43 having a stationary end wall 44 suitably secured to a frame 45 and a movable end wall 46 from which extends a stem 47 guided in a portion 48 of the frame 45 and extending through the wall of the chamber 22 where it projects into adjacency and alinement with the stem 24. The bulb 40, pipe 41 and vessel 42 are charged with a suitable volatile fluid. Frame 45 may be mounted in any suitable way, being shown as supported from the wall of the chamber 22, and a suitable packing gland 49 is provided where the stem 47 enters the chamber 22. Stem 47 is shown as passing through an adjustable spring abutment plate 50, and interposed between said plate and the end wall 46 of the vessel 42 is a coil spring 51 which may be adjusted by the hand wheel 52 mounted on a threaded guide tube for the stem 47 as well understood in the art and engaging the abutment plate 50. The tension of the spring 51 may therefore be varied and determine the pressure which must exist in the chamber 42 in order to move the stem 47 further into the chamber 22 to actuate the stem 24.

In the embodiment of Fig. 2 the diaphragm 20 is operated by fluctuations of pressure in the venturi 17 to vary the admission of steam to the valve 16 in conformity with the rate of water consumption, as heretofore explained. As long as the steam pressure or the inlet water temperature conforms with the designed operation of the device the thermostatically operated stem 47 is inactive. However, in order to take full advantage of the thermostatic control, it is preferable to so design the control under the pressures in the venturi that a slight excess of steam is normally admitted by the valve 16. Therefore, in the absence of the thermostatic control, there is a slight tendency for the water to be heated above the desired temperature. The bulb 40 in the outlet of the heater, however, is sensitively responsive to any fluctuation of temperature in the outlet water. If, for example, the steam pressure should increase or the temperature of the inlet water should increase, the temperature of the outlet water will increase and the volatile fluid in the bulb 40 will increase its vapor tension to expand the vessel 42 and project the stem 47 further into the chamber 22, acting on the stem 24 to correspondingly close the valve 16. Therefore, the temperature of the water is not only controlled in conformity with the rate of consumption but in conformity with fluctuations in the pressure and temperature of the heating medium and water.

Moreover, in view of the thermostatic control thus provided the size of the parts in the control subject to the venturi can be varied within wider limits for purposes of standardization in view of the corrective nature of the regulation afforded by the thermostat control thus provided. While the thermostat control is thus responsive only to the temperature of the outlet water the rate of steam flow is still under the control of the rate of water flow in the venturi, and hence the steam valve is always approximately positioned in conformity with the needs as determined by the rate of water consumption. Therefore, while there may be some lag in the response of the thermostat, the effect is small and gradual, and hence the time lag and the hunting or cycling of earlier constructions are still avoided, because the function of the thermostat is only to make a final slight adjustment of the steam valve after it has been approximately positioned for the then existing rate of consumption by the pressures in the venturi.

The advantages of the thermostatic control to compensate for variations in inlet water temperature or to make a mere final adjustment to compensate for lack of precise conformity of the steam supply to variations in the rate of water consumption can also be combined with the provision heretofore described in conjunction with Fig. 1 for adjusting the valve in conformity with fluctuations in the steam pressure. Such a construction is illustrated in Fig. 3, wherein the component elements may be and are shown as of the same construction as heretofore described in conjunction with the embodiments of Figs. 1 and 2 and have therefore been given corresponding reference characters. In view of the detailed explanation of the operation of the embodiments of Figs. 1 and 2 heretofore given, the operation of the embodiment of Fig. 3 will be apparent.

While for simplification and compactness it is generally preferable to employ a single valve in the steam line, it is sometimes desirable to provide two valves, one of which will be responsive to one or two of the foregoing three sources of controls, while the other valve will be responsive to another of the foregoing sources of controls. This has been illustrated in Fig. 4 wherein a second valve mechanism 16' has been interposed in the inlet pipe 13 and connected to the stem 47 of the thermostatic control described in conjunction with Figs. 2 and 3. The valve mechanism 16 is under the control of the pressures in the venturi 17 as heretofore explained in conjunction with the embodiments of Figs. 1 and 3. As the component elements are otherwise the same, they have been given the same reference characters. As will be apparent, various other combinations of the several sources of control could be employed with the use of valves as here shown.

It will therefore be perceived that in accordance with the present invention an automatic control for an instantaneous water heater has been provided which is available for use with steam as a heating medium, which eliminates the time lag and the hunting and cycling heretofore characteristic of instantaneous heater controls, which is directly and promptly responsive to fluctuations in the rate of water consumption, which may respond to either or both of the fluctuations in the pressure of the heating medium or the temperature of the water, which eliminates the use of a steam reducing valve, which eliminates the need for adjustments under fluctuating conditions of the heating medium and the water temperature, which facilitates standardization of the parts, which is readily adjustable to suit particular installations, and which is both relatively simple in construction and economical in its use of the heating medium.

While the embodiments of the invention illustrated on the drawings have been described with considerable particularity, it is to be expressly understood that the invention is not restricted thereto, as the invention is capable of receiving a variety of mechanical expressions, as will be apparent to those skilled in the art, while the construction supplied by the venturi can be obtained in other ways, various combinations of the controls heretofore described and illustrated may be provided, certain features may be used without other features, and changes may be made in the type of valve mechanism employed, the type of thermostat used, the manner and character of connecting and mounting the various parts as well as in the details of structure, material, size and proportions of parts. Reference is therefore to be had to the appended claims for a definition of the limits of the invention.

What is claimed is:

1. In a device for automatically controlling the flow of steam to an instantaneous water heater, in combination with the heater, its inlet and outlet water connections and its steam inlet, a valve in said steam inlet, and means for automatically controlling said valve including means providing a constriction in the water connections, means responsive to a differential in pressure existing at two points in said water connections by reason of said constriction for operating said valve in accordance with varying rates of water flow, and means responsive to variations in the steam pressure for operating said valve.

2. In a device for automatically controlling the flow of steam to an intsantaneous water heater, in combination with the heater, its inlet and outlet water connections and its steam inlet, a valve in said steam inlet, and means for automatically controlling said valve including means providing a constriction in the water connections, means responsive to a differential in pressure existing at two points in said water connections by reason of said constriction for operating said valve in accordance with varying rates of water flow, and means responsive to variations in the temperature of the water for operating said valve.

3. In a device for automatically controlling the flow of steam to an instantaneous water heater, in combination with the heater, its inlet and outlet water connections and its steam inlet, a valve in said steam inlet, and means for automatically controlling said valve including means providing a constriction in the water connections, means responsive to a differential in pressure existing at two points in said water connections by reason of said constriction for operating said valve in accordance with varying rates of water flow, means responsive to variations in the steam pressure for operating said valve, and means responsive to variations in the temperature of the water flowing from said heater for operating said valve.

4. In a device for automatically controlling the flow of steam to an instantaneous water heater, in combination with the heater, its inlet and outlet water connections and its steam inlet, a valve in said steam inlet, and means for automatically controlling said valve including a pressure responsive element connected to points of differential pressure in said water connections and operatively connected to said valve, and means responsive to variations in the steam pressure operatively connected to said valve.

5. In a device for automatically controlling the flow of steam to an instantaneous water heater, in combination with the heater, its inlet and outlet water connections and its steam inlet, a valve in said steam inlet, and means for automatically controlling said valve including a pressure responsive element connected to points of differential pressure in said water connections and operatively connected to said valve, and means responsive to variations in the water temperature operatively connected to said valve.

6. In a device for automatically controlling the flow of steam to an instantaneous water heater, in combination with the heater, its inlet and outlet water connections and its steam inlet, a valve in said inlet, and means for automatically controlling said valve including a pressure responsive element connected to points of differential pressure in said water connection and operatively connected to said valve, means responsive to variations in the steam pressure operatively connected to said valve, and a thermostat subjected to the temperature of the water in the outlet connections and operatively connected to said valve.

7. In a device for automatically controlling the flow of steam to an instantaneous water heater, in combination with the heater, its inlet and outlet water connections and its steam inlet, a valve in said steam inlet, and means for automatically controlling the said valve including means responsive to variations in the rate of water consumption for operating said valve, and a pressure operated device subjected to fluctuations in the steam pressure operatively connected to said valve.

8. In a device for automatically controlling the flow of steam to an instantaneous water heater, in combination with the heater, its inlet and outlet water connections and its steam inlet, a valve in said steam inlet, and means for automatically controlling the said valve including means responsive to variations in the rate of water consumption for operating said valve, and a thermostat subjected to the temperature of water and operatively connected to said valve.

9. In a device for automatically controlling the flow of steam to an instantaneous water heater, in combination with the heater, its inlet and outlet water connections and its steam inlet, a valve in said steam inlet, and means for automatically controlling the said valve including means responsive to variations in the rate of water consumption for operating said valve, means responsive to fluctuations in the steam pressure for operating said valve, and a thermostat subjected to the temperature of the water in the outlet connections for operating said valve.

10. In a device for automatically controlling the flow of steam to an instantaneous water heater, in combination with the heater, its inlet and outlet water connections and its steam inlet, a valve in said steam inlet, and means for automatically controlling said valve including mechanism responsive to variations in the rate of water consumption for the opening and closing of said valve, and means responsive to the temperature of the outlet water for modifying the adjustment of said valve.

11. In a device for automatically controlling the flow of steam to an instantaneous water heater, in combination with the heater, its inlet and outlet water connections and its steam inlet, a valve in said steam inlet, and means for automatically controlling said valve including a diaphragm operatively connected to said valve, means for subjecting said diaphragm to differential pressures created at two points in said water connections for controlling said valve in conformity with the rate of water consumption, a second diaphragm operatively connected to said valve, and means for subjecting said second diaphragm to fluctuations in the pressure of the steam.

12. In a device for automatically controlling the flow of steam to an instantaneous water heater, in combination with the heater, its inlet and outlet water connections and its steam inlet, a valve in said steam inlet, and means for automatically controlling said valve including a diaphragm operatively connected to said valve, means for subjecting said diaphragm to differential pressures created at two points in said water connections for controlling said valve in conformity with the rate of water consumption, and a thermostat subjected to the temperature of the water flowing from said heater and operatively associated with said diaphragm to modify the action of said valve in conformity with fluctuations of temperature in the outlet water.

13. In a device for automatically controlling the flow of steam to an instantaneous water heater, in combination with the heater, its inlet and outlet water connections and its steam inlet, a valve in said steam inlet, and means for automatically controlling said valve including a pressure responsive device operatively connected to said valve, means for subjecting said pressure responsive device to differential pressures created at two points in the water connections, a second pressure responsive device operatively connected to said valve, means for subjecting said second pressure responsive device to fluctuations of pressure existing in said steam inlet, and resilient means operatively connected with said valve and cooperating to predetermine the algebraic sum of the pressures whereby said valve will be operated in conformity with fluctuations in the water consumption and in the steam pressure.

14. In a device of the character described, in combination with a water heater, its inlet and outlet water connections and a conduit for the supply of heating medium, means in said last named conduit for controlling the flow of heating medium and including means responsive to fluctuations in the rate of flow of the water for varying the flow of said heating medium, and means responsive to the temperature of the water for varying the flow of said heating medium.

15. In a device of the character described, in combination with a water heater, its inlet and outlet water connections and a conduit for the supply of heating medium, means in said last named conduit for controlling the flow of heating medium and including means for varying the flow of heating medium in conformity with the rate of consumption of said water, and means responsive to the fluctuations in the pressure of said heating medium for varying the flow of said heating medium.

16. In a device of the character described, in combination with a water heater, its inlet and outlet water connections and a conduit for the supply of heating medium, means in said last named conduit for controlling the flow of heating medium and including means responsive to the rate of water consumption for varying the flow of said heating medium and a means responsive to the temperature of the outflowing water for varying the flow of the heating medium.

17. In a device of the character described, in combination with a water heater, its inlet and outlet water connections and a conduit for the supply of heating medium, means for controlling the flow of heating medium including a valve in said conduit for heating medium, a pressure responsive device operatively connected to said valve, means providing a constriction in a water conduit, means for subjecting said pressure responsive device to differential pressures in said water conduit existing by reason of said constriction, a second means for operating said valve in said conduit for heating medium, and a thermostat subjected to the water temperature and operatively connected to said last named means.

18. In a device of the character described, in combination with a water heater, its inlet and outlet water connections and a conduit for the supply of heating medium, means for controlling the flow of heating medium and including valve mechanism in said conduit for heating medium, means for operating said valve mechanism including a pressure responsive device operatively connected to said valve mechanism and subjected to differential pressures existing in a water conduit, and supplementary means for operating said valve mechanism including a pressure responsive device subjected to the pressure in the conduit for heating medium.

19. In a device of the character described, in combination with a water heater, its inlet and outlet water connections and a conduit for the supply of heating medium, means for controlling the flow of heating medium and including valve mechanism in said conduit for heating medium, means for operating said valve mechanism including a pressure responsive device operatively connected to said valve mechanism and subjected to differential pressures existing in the water conduit, a second pressure responsive device operatively connected with the valve mechanism and subjected to variations of pressure in the conduit for heating medium, and an adjustable spring for predetermining the algebraic sum of the pressures existing on said valve mechanism.

20. In a device of the character described, in combination with a water heater, its inlet and outlet water connections and a conduit for the supply of heating medium, means for controlling the flow of heating medium and including valve mechanism in said conduit for heating medium, means for operating said valve mechanism including means responsive to fluctuations in the rate of water consumption for varying said valve mechanism approximately to maintain a uniform temperature in the outlet water, and means responsive to the temperature in the water outlet for nicely adjusting said valve mechanism to maintain a uniform temperature in the outlet water.

21. In a device of the character described, in combination with a heater, inlet and outlet water connections therefor and a conduit for supplying heating medium thereto, valve mechanism in said conduit for heating medium, and automatic means for operating said valve mechanism to vary the supply of heating medium proportionally to the rate of water consumption, said means comprising a constriction in the water connections, a pressure responsive device, means for subjecting the same to differential pressure existing at two points in said water connections by reason of said constriction, said pressure responsive device being operatively connected with said valve mechanism, and means for varying the supply of heating medium in conformity with variations in the pressure of said heating medium.

22. In a device of the character described, in combination with a heater, inlet and outlet water connections therefor and a conduit for supplying heating medium thereto, valve mechanism in said conduit for heating medium, and automatic means for operating said valve mechanism to vary the supply of heating medium proportionally to the rate of water consumption, said means comprising a constriction in the water connections, a pressure responsive device, means for subjecting the same to differential pressures existing at two points in said water connections by reason of said constriction, said pressure responsive device being operatively connected with said valve mechanism, and means for varying said heating medium in conformity with changes in temperature in the water.

23. In a device of the character described, in combination with a heater, inlet and outlet water connections therefor and a conduit for supplying heating medium thereto, valve mechanism in said conduit for heating medium, and automatic means for operating said valve mechanism to vary the supply of heating medium proportionally to the rate of water consumption, said means comprising a constriction in the water connections, a pressure responsive device, means for subjecting the same to differential pressures existing at two points in said water connections by reason of said constriction, said pressure responsive device being operatively connected with said valve mechanism, and means for varying the supply of heating medium responsive to the temperature of the water.

24. In a device for automatically controlling the flow of heating medium to a water heater, in combination with the heater and its inlet and outlet water connections, means for controlling the flow of heating medium to said heater, means for automatically operating said controlling means including means providing a constriction in the water connections, means responsive to a differential in pressure existing at two points in said water connections by reason of said constriction for operating said controlling means in accordance with varying rates of water flow, and means responsive to variations in the pressure in the heating medium for operating said controlling means.

25. In a device for automatically controlling the flow of heating medium to a water heater, in combination with the heater and its inlet and outlet water connections, means for controlling the flow of heating medium to said heater, means for automatically operating said controlling means including means providing a constriction in the water connections, means responsive to a differential in pressure existing at two points in said water connections by reason of said constriction for operating said controlling means in accordance with varying rates of water flow, and means responsive to variations in the temperature of the water for operating said controlling means.

ALDEN D. STEWART.